May 5, 1953     M. G. SPANGLER ET AL     2,637,198
METHOD OF AND APPARATUS FOR TESTING ASPHALTIC CONCRETE
Filed April 27, 1950     2 SHEETS--SHEET 1
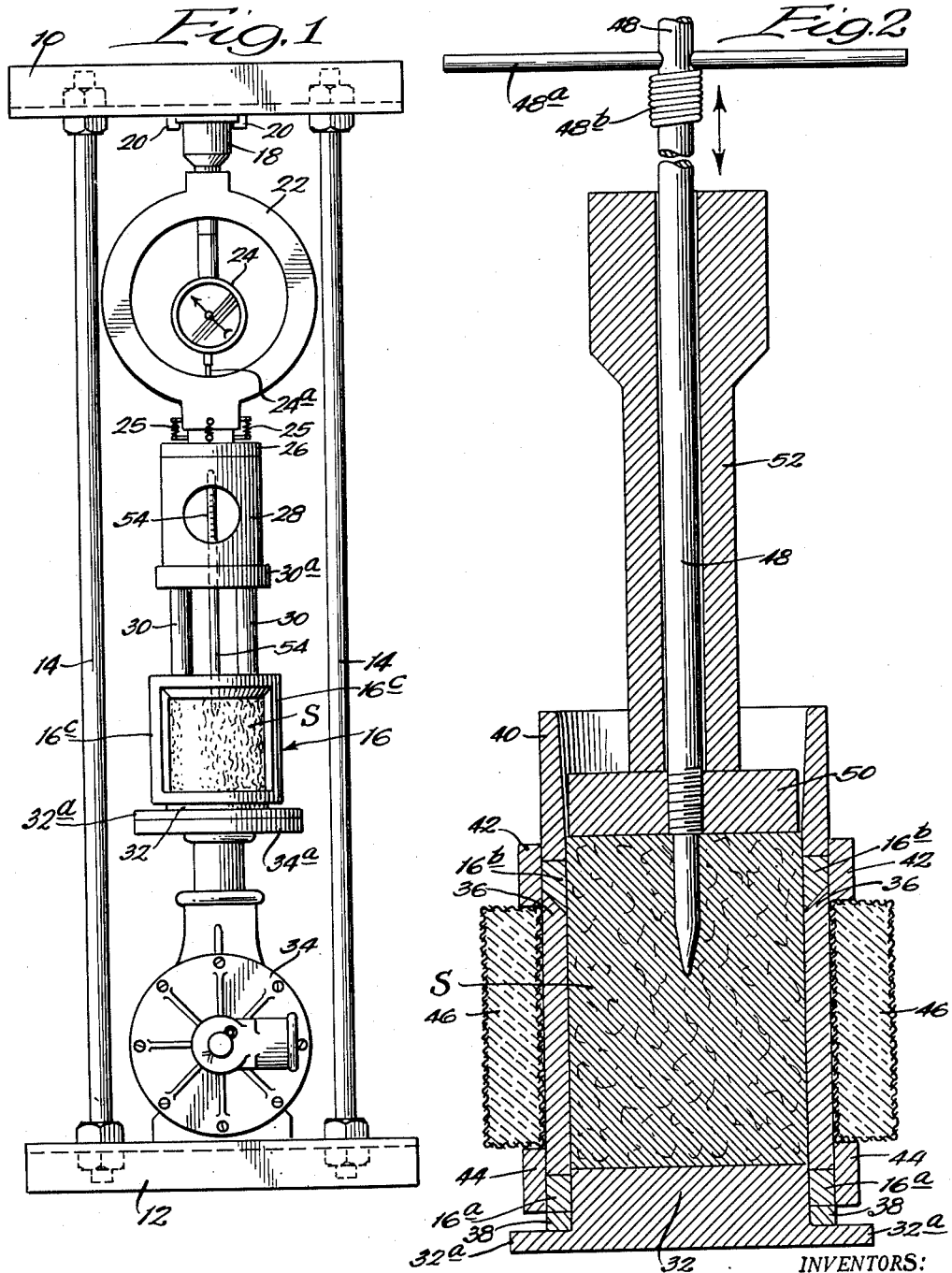
INVENTORS:
Merlin G. Spangler
and Ting Ye Chu,
BY Dawson, Orms, Booth and Daugenty,
ATTORNEYS.

May 5, 1953 — M. G. SPANGLER ET AL — 2,637,198
METHOD OF AND APPARATUS FOR TESTING ASPHALTIC CONCRETE
Filed April 27, 1950 — 2 SHEETS—SHEET 2
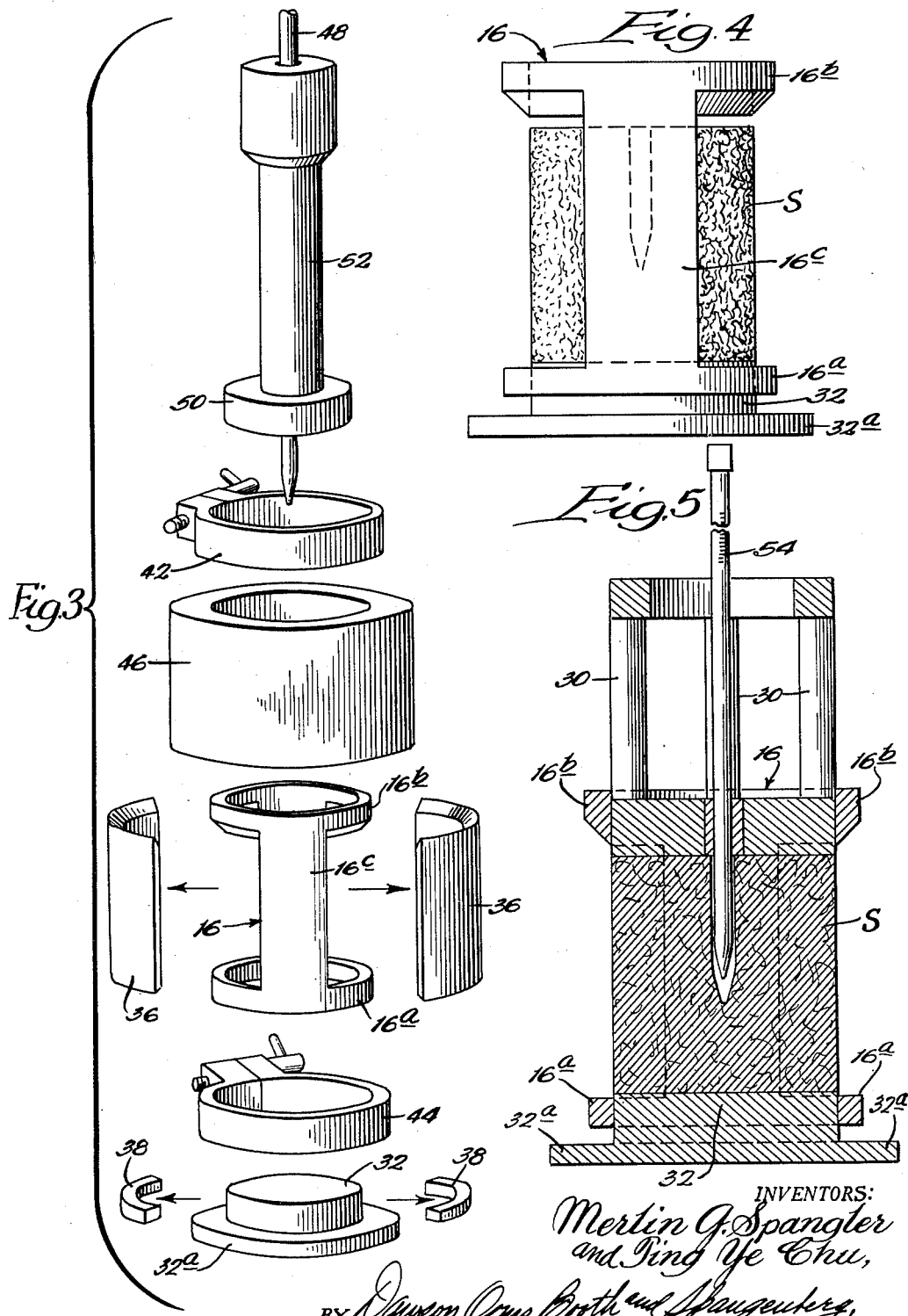

Patented May 5, 1953

2,637,198

UNITED STATES PATENT OFFICE 2,637,198

METHOD OF AND APPARATUS FOR TESTING ASPHALTIC CONCRETE

Merlin G. Spangler and Ting Ye Chu, Ames, Iowa, assignors to Iowa State College Research Foundation, Inc., Ames, Iowa, a corporation of Iowa Application April 27, 1950, Serial No. 158,566

5 Claims. (Cl. 73—15.6)

Our invention relates to an improved method of an apparatus for testing asphaltic concrete characterized by the ability to test asphaltic concrete in the condition it is poured without requiring substantial delay and by the use of easily portable field testing equipment.

Asphaltic concrete consisting of a mixture of an aggregate and an asphalt binder is a highly successful "black top" road material when poured under proper conditions of mix and temperature. However, the ability of this material to withstand severe road usage may be greatly reduced if the conditions of application depart from ideal. Unfortunately, it has to date been impossible as a practical matter to measure and control all of the various characteristics of the asphaltic concrete mix that influence the ability of the resultant road to withstand usage. As a consequence roads have been poured on a more or less empirical or hit or miss basis with the operators attempting to control the pour to avoid a poor mix but never having any real assurance that the mix is proper until the time necessary for specimens to be sent to remote laboratories for time consuming tests has expired. By this time the road is finished and the data as to the condition of the concrete gives little useful guidance for its construction.

In accordance with the present invention a reliable method suitable for on the spot testing of asphaltic concrete mix is provided and a convenient portable apparatus for such testing is made available. The operator by the use of the method and apparatus of this invention can determine at the time of pouring the quality of the mix he is using and the character of the resultant road. He can make on the spot alterations in the composition or method of mixing the mix and, even if the reason these alterations are effective is not understood, their overall significance is readily established by the method and apparatus of the present invention and the operator has the assurance that the resultant road or other structure will be satisfactory.

It is therefore a general object of the present invention to provide an improved method of and means for testing asphaltic concrete mix.

Another object of the present invention is to provide an improved method of and means for testing asphaltic concrete mix that is suitable for on the spot use as a road or other structure is being poured.

Yet another object of the present invention is to provide an improved method of and means for testing asphaltic concrete mix which effectively tests for all the factors, known and unknown, that enter into the ability of the mix to form durable concrete.

The novel features which we believe to be characteristic of the present invention are set forth with particularity in the appended claims. Our invention itself, however, both as to the steps of operation of the apparatus, together with further objects and advantages thereof, will best be understood by reference to the following drawings, in which:

Figure 1 is a side elevational view of the apparatus of the present invention while testing a sample;

Figure 2 is an enlarged axial cross-sectional view showing the apparatus of the present invention while a sample is being compacted;

Figure 3 is an exploded view of the apparatus for holding and compacting the sample;

Figure 4 is an enlarged side elevational view of the sample holding case with a specimen in place; and, Figure 5 is a fragmentary axial cross-sectional view of the sample and immediately associated mechanism in condition for the final testing.

Referring now to Figure 1, the testing apparatus includes upper and lower angle iron yoke bars 10 and 12 held a fixed distance apart by the tension bolts 14 which are secured to the horizontal flange of each yoke bar by opposed nuts as shown. The pressure applying apparatus itself is sandwiched between yokes 10 and 12 to exert controlled compression on the cylindrical sample S contained within the cage 16.

The various elements sandwiched between the yokes 10 and 12 include the upper centering post 18 secured against movement relative to the upper yoke 10 by the L-shaped seat defining brackets 20. The circular compression ring 22 is positioned below post 18 and bears upon the compression plate 26. The plate 26 seats on the top of the apertured cylinder 28 which in turn bears against the top 30a of the upper or top compression ram 30. This ram seats on the top face of the sample S and is capable of up and down movement independently of the cage 16 although it fits rather snugly in the cage.

The bottom of the sample S rests on the lower or bottom ram 32 which likewise is free to move in the cage 16 although it fits rather snugly therein. Ram 32 seats on the upper platform 34a of the hydraulic or screw jack which applies controlled pressure to the sample.

When the sample S is being tested, the pressure applied by jack 34 is increased gradually until the sample collapses and the material therein comes out of the windows defined by the cage 16. During the period of pressure buildup the compression ring 22 assumes an elliptical shape of progressively decreased minor axis. The length of this axis is measured by the indicating micrometer gauge 24 which is attached to the upper part of the compression ring 22 and has a movable measuring pin resting against the diametrically opposed point on the ring, thus indicating with a high degree of accuracy the length of the minor axis of the compression ring. The deflection of the gauge 24 increases with increasing pressure and within the elastic limit of the ring 22 is a measure of the pressure exerted on sample S. For small deflections the deflection is proportional to the pressure. In any event the force in pounds corresponding to the maximum deflection of the meter 24 before collapse of the sample S can be determined by reference to the calibration curve of the pressure ring.

The pressure applying step shown in Figure 1 is the last step in the method of testing the asphaltic concrete mix. The earlier steps necessary to prepare the sample for test are illustrated in Figures 2 to 5. In Figure 2 the apparatus is shown in the tamping or initial packing condition. The curved closures 36 (see Figure 3) for the windows formed in the cage 16 when in place define a cylindrical cavity in conjunction with the cage. The cage 16 is supported on the flange 32a of the lower ram 32 by the diametrically opposed arcuate blocks 38 (see Figure 3). A cap 40 is positioned at the top of the cage 16 and is held in registry with the cage by the releasable ring 42. This ring and the complementary like lower ring 44, also holds the arcuate closures 36 in place. A jacket 46 of good heat insulating material surrounds the central portion of the cage 16 to reduce the rate of temperature drop during the preparation of the sample.

The material of sample S is placed in the cylindrical cavity defined by cage 16 and closures 36 by pouring it into the cap 40. The sample consists of a representative portion of the asphalt concrete taken at the time it is being poured and accurately weighed. In an actual test mechanism we have used approximately 1850 grams. When the sample is taken, its temperature is usually about 290° F. but by the time weighing is completed, it drops to about 260° F. At this temperature it is poured into the apparatus of Figure 2.

We have found that it is quite important to pour the sample at a predetermined temperature, preferably about 260° F. Moreover, when the mix is scraped from the weighing pan, care must be taken to avoid segregation of the aggregated particles.

When the sample S has been poured, the vertical plunger guide shaft 48 is pushed into the center of the cylindrical sample as shown. This shaft has a pointed end to facilitate insertion and is about 27 inches long. It is made the same size and shape as the armored thermometer 54. At its upper end it receives the handle 48a and the seating spring 48b. A short distance from its lower end it threadedly receives the hammer seat 50 which fits on the sample S as shown.

The hammer 52 is received loosely by shaft 48 and is capable of imparting a predetermined blow or impact against the sample when dropped from the bottom edge of the spring 48b.

After the sample S has been poured and the shaft 48 inserted, a predetermined number of hammer blows, such as ten, are applied with the curved blocks 38 in place. While these blows are being applied, the cage 16 is supported by the blocks 38. The blocks 38 are then removed and another predetermined number of blows, such as 40, are applied. During these blows a double plunger action results from the fact that the cage 16 and its associated parts float freely and their weight and that of the sample S is supported solely by the sample itself, with the consequent increased compaction.

The hammer blows should be applied at a uniform rate, say one per second, and the shaft 48 should be held in a vertical position.

Following the hammer blows the shaft 48 is removed and the armored thermometer 54, Figures 1 and 5, is inserted in the hole in the sample S. The compression ram 30 is then placed over the thermometer and on the specimen and the unit placed on the testing mechanism of Figure 1 with the closures 36, heat insulator 46, and rings 42 and 44 in place. The jack 34 is then adjusted to deflect the ring 22 in the amount corresponding to 1000 pounds per square inch or similar predetermined pressure and that pressure held for one minute and released.

While the foregoing steps are being carried out, the temperature of the sample is dropping and should reach a value somewhat above 170° F. The extension ring or cap 40 is then removed from the sample and the reading of the thermometer 54 noted. When the temperature falls to 170° F. or similar predetermined temperature, the rings 42 and 44, together with the jacket 46, are removed and the pressure applied to the specimen as described above in connection with Figure 1.

Figure 4 is an enlarged side view showing the condition of the sample after compaction. As shown, the sample S rests solidly on the lower ram 32. The cage 16 is in contact with the sample S by means of the diametrically opposed posts 16c, and is supported by friction between the sample and these posts. The upper end ring 16b and the lower ring 16a of the cage 16 do not support the sample in any way, since they are above and below the upper and lower faces of the sample.

The only parts of the cage 16 in engagement with the sample are the diametrically opposed posts 16c. These posts support the sample against collapse over a portion of its cylindrical surface and provide a condition of semi-confinement during test.

Figure 5 shows the sample, thermometer, and cage 16, and rams 30 and 32 in the condition assumed during test as shown in Figure 1.

Extensive tests of the method and apparatus of the present invention show that the reading on the meter 24 just before collapse of the sample S prepared as described above is an accurate index of the strength and durability of the mix comprising the sample. These tests have included comparisons with other more difficult and more time consuming tests for asphalt concrete as well as tests of concrete after hardening.

While we have shown and described a specific embodiment of the apparatus of the present and a single application of the method thereof, it will of course be understood that many modifications may be made without departing from the true spirit and scope of the present invention. We therefore intend to cover all modifications and alternative arrangements falling within the true spirit and scope of the appended claims.

What we claim as new and desire to secure by Letters Patent of the United States is:

1. A device for testing asphaltic concrete mix or the like comprising in combination a cage with a cylindrical bore providing a plurality of windows in the walls thereof, closures adapted to mate with said windows respectively to define a cylindrical cavity to receive a pressure ram, and a pressure ram adapted to be received by the cage to fit on a sample therein and exert axial pressure thereon.

2. A device for testing asphaltic concrete mix or the like comprising in combination a cage with a cylindrical bore and having upper and lower end rings and windows therebetween separated by relatively narrow longitudinally extending posts, closures adapted to fit in the windows respectively to define a cylindrical cavity to receive a pressure ram, a seating ram adapted to fit in the cavity and to support material therein independently of the support of the cage, and a top ram adapted to seat on the top of the material in the cavity to exert axial compression thereon.

3. A device for testing asphaltic concrete mix or the like comprising in combination a cage with a cylindrical bore providing a plurality of windows in the walls thereof of relatively large area compared to the closed area of said walls, closures adapted to seat in the windows respectively to define a cylindrical cavity to receive a pressure ram, sleeve means adapted to fit over the cage and closures to secure the closures in place and to define a heat insulating barrier about the cage and closures, a seating ram adapted to fit in the cavity and to support the material therein independently of the cage, and a top ram adapted to seat on the top of the material in the cavity to exert axial pressure thereon.

4. In a method of testing asphaltic concrete mix or the like, the steps of forming a cylindrical body from a measured quantity of asphaltic concrete at a predetermined temperature and in a moldable condition, forming an axially aligned temperature well in said body of relatively small cross sectional area, axially compacting said body to a uniform density while maintaining said well therein, cooling said body to a predetermined temperature as measured within said well to harden said body, and then subjecting said body to axial stress until said body is ruptured.

5. A device for testing asphaltic concrete mix or the like, comprising in combination a cage with a cylindrical bore having at least one window in the walls thereof of relatively large area compared to the closed area of said walls, a closure adapted to mate with said window to close the same and thereby provide a cylindrical cavity to receive a pressure ram, and a pressure ram adapted to be received by the cage to fit on a sample therein and exert axial pressure thereon.

MERLIN G. SPANGLER.
TING YE CHU.

References Cited in the file of this patent

UNITED STATES PATENTS

| Number | Name | Date |
| --- | --- | --- |
| 820,922 | Einsele | May 15, 1906 |
| 1,826,732 | Chatillon | Oct. 13, 1931 |
| 1,979,267 | Howe | Nov. 6, 1934 |
| 2,186,824 | Dietert | Jan. 9, 1940 |
| 2,351,100 | Brelsford | June 13, 1944 |
| 2,447,586 | Marshall | Aug. 24, 1948 |
| 2,471,227 | Marshall | May 24, 1949 |